(12) United States Patent
Ye

(10) Patent No.: US 8,499,554 B2
(45) Date of Patent: Aug. 6, 2013

(54) STABLE POWER-OUTPUT DEVICE WITH A LINEAR LONG-SHAFT DRIVEN BY WAVES

(76) Inventor: Xuefeng Ye, Jiangsu (CN)

( * ) Notice: Subject to any disclaimer, the term of this patent is extended or adjusted under 35 U.S.C. 154(b) by 887 days.

(21) Appl. No.: 12/666,401

(22) PCT Filed: Jul. 3, 2008

(86) PCT No.: PCT/CN2008/001264
§ 371 (c)(1),
(2), (4) Date: Dec. 23, 2009

(87) PCT Pub. No.: WO2009/003371
PCT Pub. Date: Jan. 8, 2009

(65) Prior Publication Data
US 2010/0175373 A1    Jul. 15, 2010

(30) Foreign Application Priority Data
Jul. 3, 2007  (CN) ...................... 2007 2 0071998 U

(51) Int. Cl.
*F03C 1/00* (2006.01)
(52) U.S. Cl.
USPC .................. 60/505; 60/497; 290/42; 290/53
(58) Field of Classification Search
USPC ......... 60/497–507; 290/42, 53; 417/330–333, 417/337
See application file for complete search history.

(56) References Cited

U.S. PATENT DOCUMENTS

| 2,384,536 | A | * | 9/1945 | Crumble | ......................... 60/711 |
| 4,185,464 | A | * | 1/1980 | Rainey | ............................ 60/496 |
| 4,319,454 | A | * | 3/1982 | Lucia | .............................. 60/506 |
| 4,598,547 | A |   | 7/1986 | Danihel | |
| 4,718,231 | A |   | 1/1988 | Vides | |
| 4,838,025 | A | * | 6/1989 | Nelis | ............................... 60/505 |

FOREIGN PATENT DOCUMENTS

| CN | 201050440 | Y | 4/2008 |
| DE | 4134692 | A1 | 5/1992 |
| JP | 61197764 | A | 9/1986 |

* cited by examiner

*Primary Examiner* — Hoang Nguyen
(74) *Attorney, Agent, or Firm* — Alan Kamrath; Kamrath IP Lawfirm, P.A.

(57) ABSTRACT

A stable power-output device driven by waves includes buoys and a scaffold with the buoys, guiding tracks and rotating shafts installed. The scaffold floats on the waves, and wheels are installed at two sides of the buoys. Each two of the roller wheels are sandwiched between the related guiding track and the related side of each buoy, so that the roller wheels and the guiding tracks can work together. Guiding devices are installed on top of the buoys, and rotating shafts are connected to the guiding devices and float horizontally on the waves. Ratchets are installed on the short shafts in contact with the guiding devices. A shaft connector is adapted to connect each two of the rotating shafts together and form a long shaft.

3 Claims, 1 Drawing Sheet

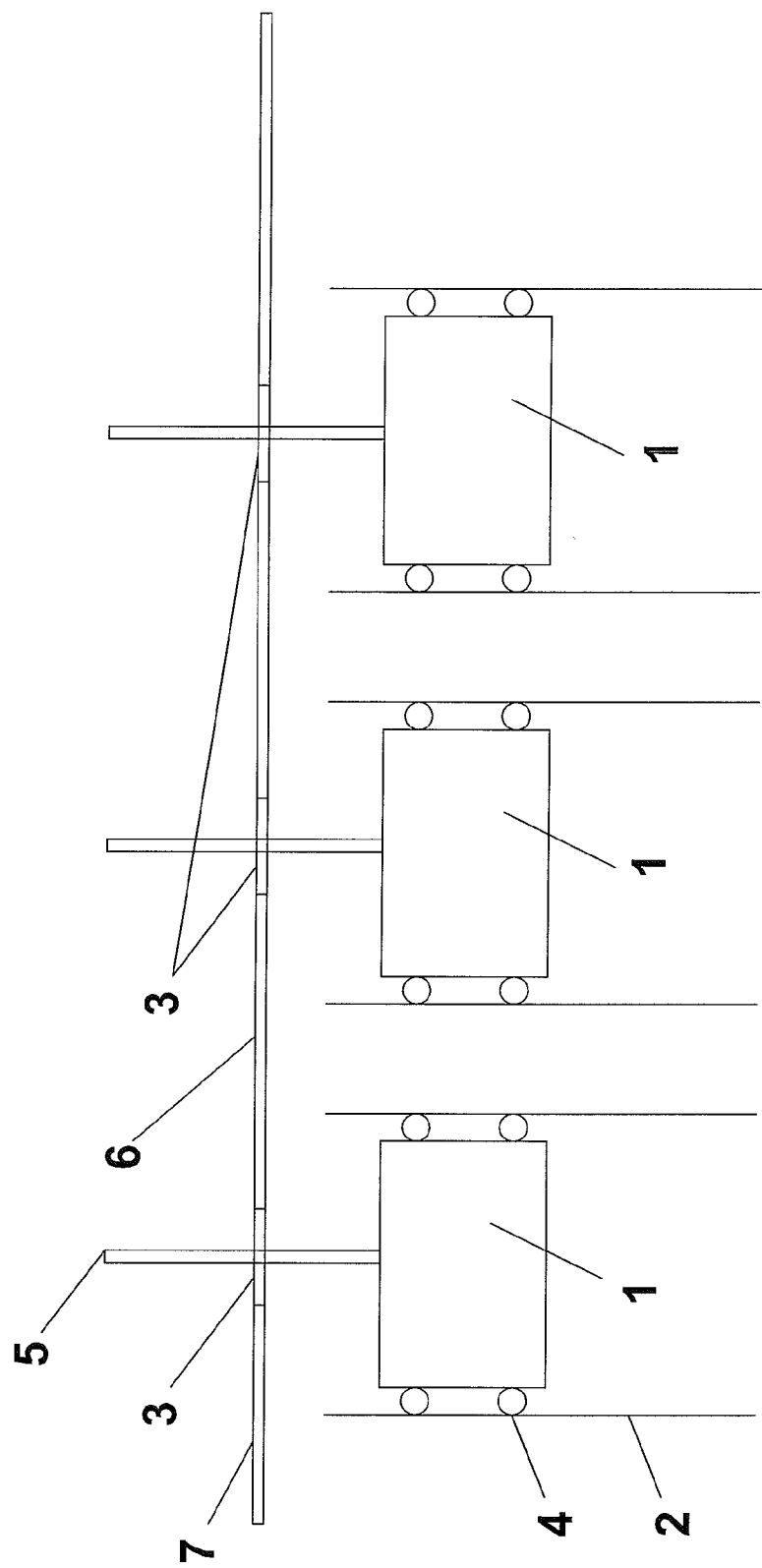

STABLE POWER-OUTPUT DEVICE WITH A LINEAR LONG-SHAFT DRIVEN BY WAVES

BACKGROUND OF THE INVENTION

1. Field of the Invention

This invention involves a power-output device and, especially, relates to a stable power-output device with a linear long-shaft driven by waves as a driving force.

2. Description of the Related Art

There are vast amounts of energy carried in waves, and it is a green, environmental friendly renewable energy source. Until now, this energy resource has not been developed and utilized effectively. With the forthcoming shortage of oil and coal energy, environmental pollution is getting worse every day. The utilization of wave energy has a very great and practical meaning, as well as a huge economic benefit.

However, waves have a wide range of fluctuation and, hence, the big variation of the mechanical output power driven by waves. Therefore, the design of a stable output power of the mechanical device driven by waves is the most critical problem to tackle.

SUMMARY OF THE INVENTION

The present invention provides a stable power-output device solving the fluctuation problem of the mechanical output power driven by waves.

The technical solution of the invention is a stable power-output device with a linear long-shaft driven by waves having line-up buoys floating at sea and a scaffold where the buoys, guiding tracks and rotating shafts are installed. The scaffold floats on the waves, roller wheels are installed at both sides of the buoys, and guiding tracks are placed at the sides of the roller wheels so that they can work together. Guiding devices are installed on top of the buoys, and rotating shafts are connected to the guiding devices, with the rotating shafts being short shafts floating horizontally on the waves. Ratchets are installed on the short shafts and coupled to the guiding devices. A shaft connector is adapted to connect each two of the rotating shafts together to form a long linear shaft. Buoys driven by waves, move up and down along the guiding tracks and cause the guiding devices to drive the short and long shafts to rotate, hence outputting a stable moment.

The device of this invention utilizes the floating power of the buoys, driving the rotation of the shafts, making it a power-output device. To guarantee the stability of the output power, a long shaft is made to be driven to rotate by many buoys. Therefore, even if there is a wide range of fluctuation of the waves in every interval, at least one buoy drives the long shaft to rotate, so the output power provided by the long shaft is stable. The more buoys, the output power is more stable.

Hence, the device of this invention is driven by waves, will complement the forthcoming shortage of oil and coal energy, and will provide a good contribution to the development of our society.

Other advantages and features of the present invention will become apparent from the following descriptions referring to the drawings.

BRIEF DESCRIPTION OF THE DRAWINGS

The present invention will be described through detailed illustration of three embodiments referring to the drawings.

FIG. 1 is a perspective view of a stable power-output device according to the preferred embodiment of the present invention.

DETAILED DESCRIPTION OF THE PREFERRED EMBODIMENTS

Referring to FIG. 1, a stable power-output device of this invention includes line-up buoys 1 floating in sea, and a scaffold (not shown) on which the buoys 1, guiding tracks 2 and rotating shafts 3 are installed. During operation, the scaffold floats at sea by supporting floats. Roller wheels 4 and the guiding tracks 2 are installed at two sides of each buoy 1, and the roller wheels 4 are sandwiched between the related side of the buoy 1 and the related guiding track 2. The guiding tracks 2 cooperate with the roller wheels 4. Guiding devices 5 are disposed on top of each buoy 1, and the rotating shafts 3 are connected with all of the guiding devices 5. A direction of each rotating shaft 3 is perpendicular to that of each guiding device 5.

The rotating shafts 3, in this case, are actually in the form of a short shaft and floats with the scaffold in sea. The direction of each rotating shaft 3 is parallel to the sea-surface. Each rotating shaft 3 has a ratchet (not shown) adapted to be coupled to the related guiding device 5. Two of the rotating shafts 3 are connected together by a shaft connector 6 so that the rotating shafts 3 and the shaft connectors 6 form a linear long shaft 7 so that it overcomes the difficulty to produce a single long shaft for connecting the guiding devices 5. Further the shaft connector 6 can be replaced by a middle size shaft or a middle size shaft with a connector.

In this case, each guiding device 5 can be in the form of a rack or a sprocket chain. The rack type guiding device 5 can be connected to the ratchet of the related rotating shaft 3 fittingly in an engagement manner. Further, each guiding device 5 can also be in the form of a screw rod, and the screw rod type guiding device 5 is coupled to the ratchet of the related rotating shaft 3. The rack type guiding device 5 is adapted to connect each buoy 1 to the related rotating shaft 3. When the buoys 1 move upward, the rack type guiding devices 5 engage with and drive the ratchets of the rotating shafts 3 to turn. Hence, it outputs power. When the buoys 1 move downward, the guiding devices 5 disengage from the ratchets of the rotating shafts 3, and the ratchets of the rotating shafts 3 are driven to be in an idle condition. A continuous cooperation of the ratchets of the rotating shafts 3 and the guiding devices 5 of the buoys 1 allows vertical motions of the buoys 1 to be converted to rotation of the long shaft 7 which consists of the rotating shafts 3.

In practice, various numbers of buoys 1 can be used according to the users' need, and all rotating shafts 3 are connected to one another by the shaft connectors 6 to form a long shaft 7. The buoys 1 will be driven to move vertically along the guiding tracks 2 via floating power and the push of the waves. At the same time, the long shaft 7 which consists of the rotating shafts 3 and the shaft connectors 6 will be driven by the guiding devices 5 to rotate. It forms the power-output device to provide a stable output torque. Some of the buoys 1 would move upward at every moment via the push of the waves so that the long shaft 7 is driven to rotate continuously and maintains a stable speed. The amount of buoys 1 depends on how much output power users need. The more output power is needed, the larger amount of buoys 1 are required. The larger size of the buoys 1, the less weight of the buoys 1 so that the floating power provided by the buoys 1 is much larger. The floating power will make the rotating shafts 3 to rotate and provide sufficient dynamic power.

Of course, the scope of this technology should be understood by general technical personnel, and the above mentioned example is only to explain this invention, not to its limitation. Based on the scope of the concept on this invention, any change and alteration in style and model is also included in this invention's claims.

What is claimed is:

1. A stable power-output device driven by waves of a sea surface, with the power-output device comprising:
   buoys floating in the waves;
   roller wheels and guiding tracks installed at two sides of each buoy, with two of the roller wheels sandwiched between a related guiding track and a related side of each buoy with the roller wheels and the guiding tracks working together;
   a guiding device installed on top of each buoy;
   a plurality of rotating shafts connected to the guiding devices and spaced from each other;
   wherein the plurality of rotating shafts float in the waves and are parallel to the sea surface, with the plurality of rotating shafts having ratchets installed thereon and in contact with the guiding devices;
   a shaft connector connecting each two of the plurality of rotating shafts to each other, with a linear long shaft formed by the plurality of rotating shafts and the shaft connectors;
   wherein the buoys are driven by waves and move up and down along the guiding track, and wherein the guiding devices drive the linear long shaft consisting of the plurality of rotating shafts and the shaft connectors to rotate for outputting a stable torque.

2. The power-output device as claimed in claim 1, wherein the guiding devices are in a form of racks and coupled to ratchets of the plurality of rotating shafts in an engagement manner.

3. The power-output device as claimed in claim 1, wherein the guiding devices are in a form of sprocket chains and couple to sprocket wheels of the plurality of rotating shafts.

* * * * *